United States Patent

Sechler

[15] 3,675,218

[45] July 4, 1972

[54] INDEPENDENT READ-WRITE MONOLITHIC MEMORY ARRAY

[72] Inventor: Robert F. Sechler, Wappingers Falls, N.Y.

[73] Assignee: International Business Machines Corporation, Armonk, N.Y.

[22] Filed: Jan. 15, 1970

[21] Appl. No.: 3,163

[52] U.S. Cl. .......... 340/173 FF, 307/238

[51] Int. Cl. .......... G11c 11/40

[58] Field of Search .......... 340/173 FF, 174 M; 307/238

[56] References Cited

UNITED STATES PATENTS 3,471,838 10/1969 Ricketts, Jr. et al. .......... 340/174

3,390,382 6/1968 Igarashi .......... 340/173

3,548,389 12/1970 Ellis .......... 340/173 FF

*Primary Examiner*—Stanley M. Urynowicz, Jr.

*Attorney*—Hanifin and Jancin and John F. Osterndorf

[57] ABSTRACT

A memory array is formed of a plurality of memory cells arranged in a matrix and providing for the simultaneous writing of information into one portion of the array while accomplishing the retrieval of information from another portion of the array. Each cell of the array utilizes cross-coupled flip flops as the storage circuit and includes control circuitry for reading from the cell and independent control circuitry for writing into the cell. Each cell of the array is further expandable by adding appropriate reading and/or writing control circuits for providing multiple data in and/or data out bussing.

9 Claims, 9 Drawing Figures

INVENTOR
ROBERT F. SECHLER
BY John F. Osterndorf
ATTORNEY

INDEPENDENT READ-WRITE MONOLITHIC MEMORY ARRAY

BACKGROUND OF THE INVENTION

1. Field of the Invention

This invention relates to information storage arrays and, more particularly, to monolithic memory arrays operable to provide non-sequential and simultaneous reading and writing operation in discrete portions of the array.

2. Description of the Prior Art

Conventionally, non-sequential read-write arrays of cells are logic register arrays. The ordinary memory array does not permit the simultaneous occurrence of the reading and writing operations. The register arrays which employ logic latches permit such operation. However, configurations of such logic latches are considerably more detailed in implementation than are the cells of this invention. Generally, such register arrays require two to three times more circuitry than does the array of this invention.

In the ordinary memory array, the read and write operations must be performed in separate time intervals. They must be performed sequentially, whereas register arrays allow for concurrent or non-sequential read and write operation. Moreover, the ordinary memory array does not permit plural data bussing for storage or retrieval of information from the same array.

A cell of the memory type is described in U.S. Pat. No. 3,423,737 issued Jan. 21, 1969 in the name of L. R. Harper and assigned to the assignee of this invention. The memory cell of this patent employs a cross-coupled flip flop circuit for the storage of information. By applying appropriate input signals through conductive devices to the flip flop, the reading and writing of information are accomplished in sequential manner.

SUMMARY OF THE INVENTION

As contrasted with the prior art types of arrays of storage cells, the array of this invention provides for simultaneous reading of one portion of an array, such as a row of the array, while writing into another portion of the array, such as another row.

Each cell of the array utilizes the conventional cross-coupled transistor flip flop as the storage circuit for the storage of binary coded information. Dependent on the portion of the flip flop which is activated, a binary 1 bit or a binary 0 bit of information is stored in that cell. First control circuits are provided in the base circuits of the flip flop devices for activating a row of the array at a time to accomplish the retrieval of the stored information. Second control circuits are connected in the collector circuits of the devices of the flip flops for conditioning the cells of a row for writing. Through separate input connections provided to these second control circuits, binary information is stored in the flip flop.

Thus, by activating the read control circuits for one row of the array and the write control circuits for another row of the array, the storage and retrieval of information are performed simultaneously in the array. There is no timing relationship required to permit the storage and retrieval operations to occur at the same time. The arrangement of this invention also has the advantage that the flip flop is not disturbed by accessing for storage or retrieval of information making it less susceptible to spurious noise and the resulting incorrect information storage as usually occurs in the prior art types of memory cell configurations.

According to another feature of the invention, the cells are expandable to accommodate multi-data bussing. Additional first and second control circuits are connected in parallel with those in the cell and to separate input and output circuits to permit the simultaneous reading and/or writing operations to occur along plural busses. Thus, information can be stored or retrieved from more than one set of storage cells such as along a plurality of rows of an array at the same time.

DESCRIPTION OF THE PREFERRED EMBODIMENTS

Figure 1:
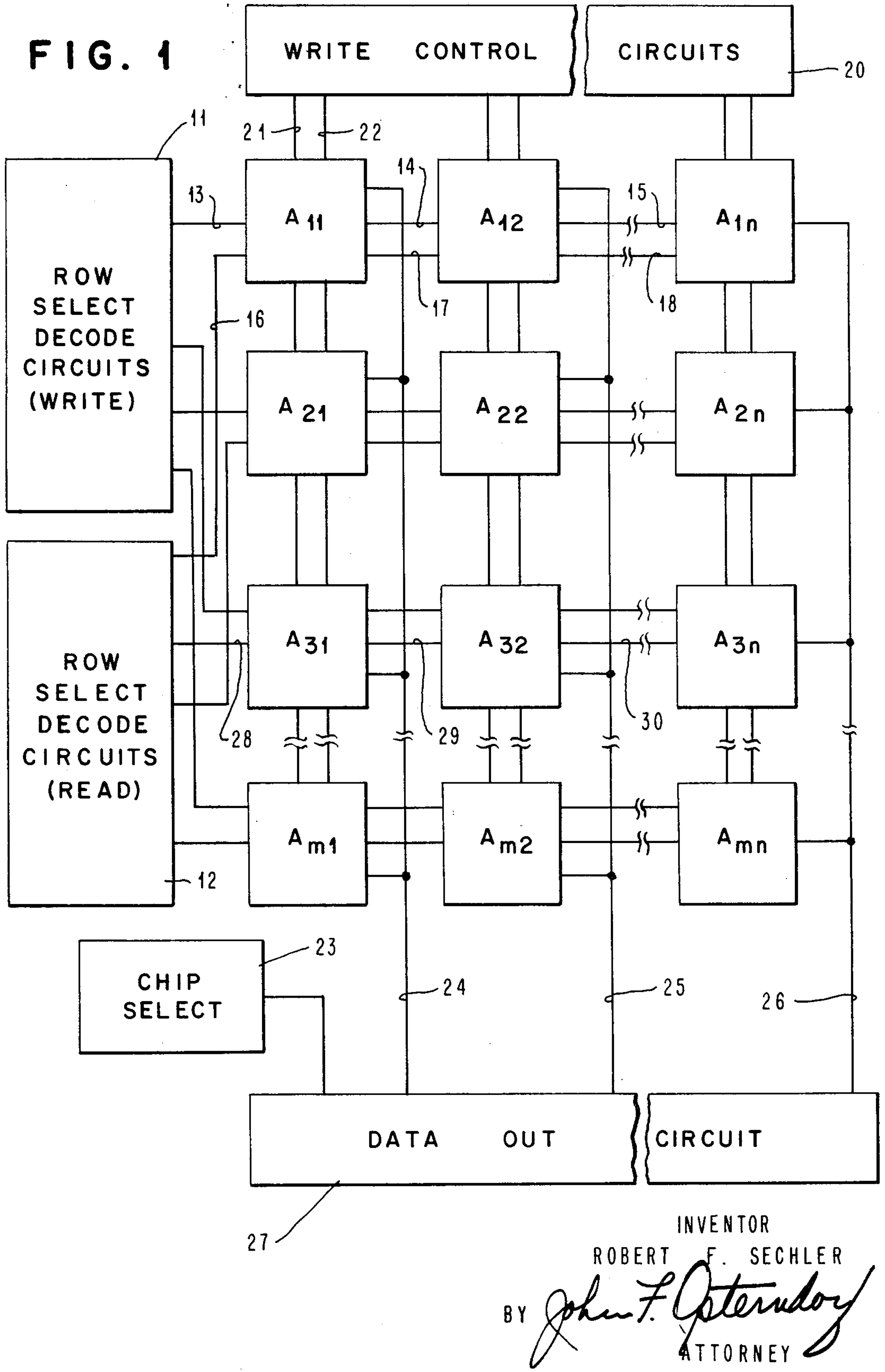
FIG. 1 is a block diagram of an array of storage cells with the required peripheral circuits.

Referring now to FIG. 1, the memory array according to the invention is formed of a plurality of storage cells arranged in a matrix All...A*mn*. The array is formed of *m* rows and *n* columns. Each of the cells is connected to appropriate row select decode circuits 11 for controlling the writing or storage of information and row select decode circuits 12 for controlling the reading or retrieval of information. Thus, the cells A11, A12...A1*n* are connected through the connections 13, 14 and 15 to the decode circuits 11. Similarly, these cells are connected through the connections 16, 17, 18 to the row select decode circuits 12.

Write control circuits 20 are provided for connection in common to the cells of a given column. Cells A11...A*m*1 are therefore connected through connections 21, 22 to circuits 20. Circuits 20 provide the signals for writing the information into selected storage cells. The decode circuits 11 act to condition a given row of cells for the performance of the writing operation. To retrieve information from a particular row of cells selected by decode circuits 12, it is also necessary that a chip containing a plurality of such cells be conditioned from chip select circuit 23. Information retrieval along the columns of the array occurs through data out busses 24, 25, 26 to the data output circuits 27.

As will be apparent from the detailed description of the cells which is presented hereinafter, the reading operation of one row of cells may be performed simultaneously with the writing operation along another row of cells. Thus, if decode circuits 11 select the row of cells formed of A11...A1*n* by activating the selection lines 13, 14 and 15 and suitable signals are provided along the lines 21, 22 to each of these cells, then writing of information is accomplished in them. In like manner, if decode circuits 12 select the row formed of cells A31...A3*n* by activating the connections 28, 29, 30 and chip select circuit 23 is also activated, then information is retrieved in the data output circuits 27 along the lines 24, 25, 26.

Figure 2:
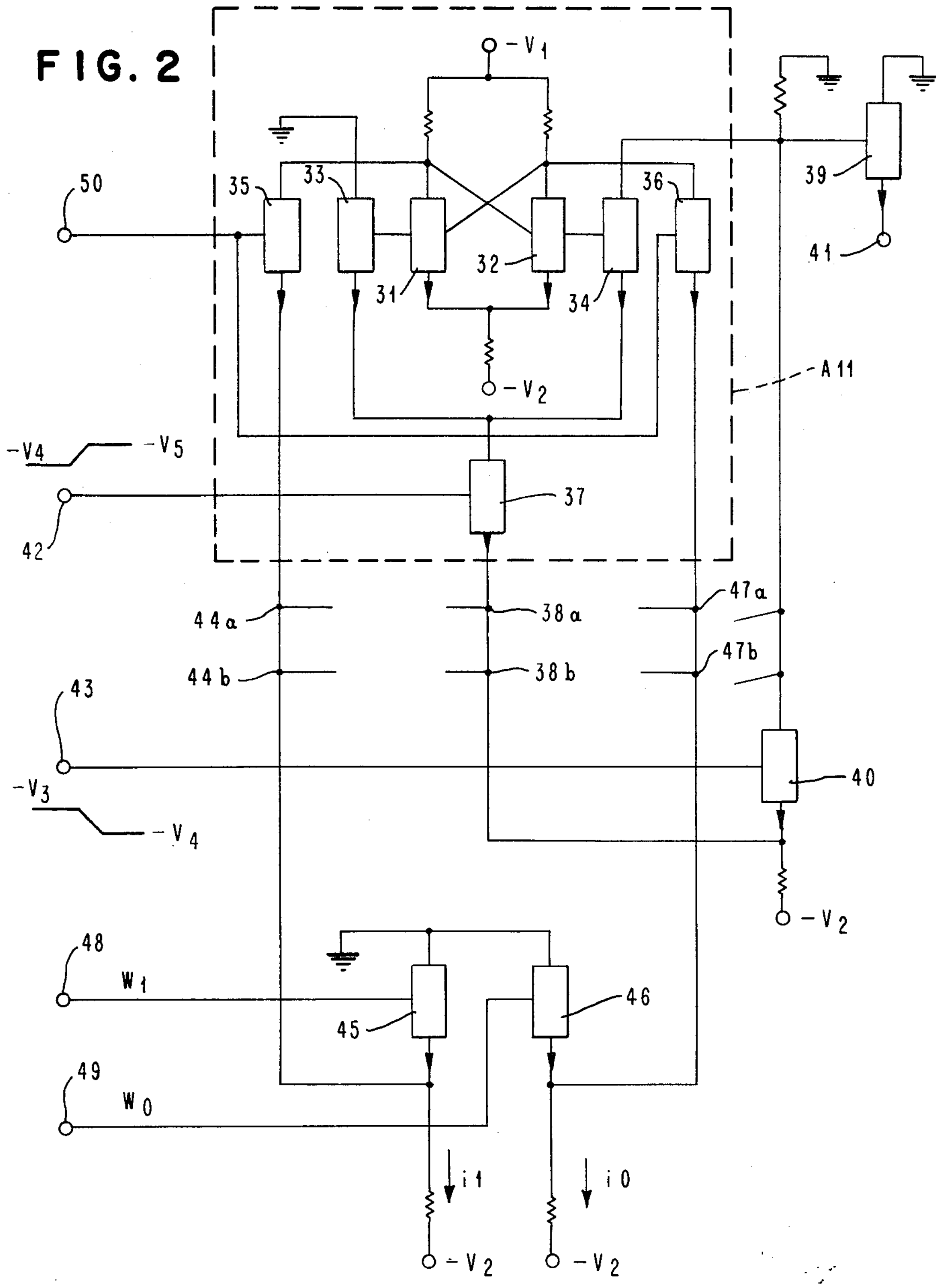
FIG. 2 is a schematic diagram of one embodiment of the storage cell according to the invention.

Referring now to FIG. 2, each of the storage cells such as the cell A11 includes a pair of cross-coupled transistors 31, 32 arranged as a bistable flip flop circuit with the base of one connected to the collector of the other and the base of the second connected to the collector of the first. The emitter electrodes are connected in common to a current sink and the collector electrodes are connected in common to a current source. Dependent on the state of transistors 31, 32 such that one is activated and the other de-activated at the same time, a binary 1 or a binary 0 is stored in the storage circuit. For purposes of this description, it is assumed that when the base of transistor 31 is more positive than the base of transistor 32, a binary 1 is stored in the circuit. In like manner, when the base of transistor 32 is more positive than the base of transistor 31, a binary 0 is stored in the circuit.

Associated with the storage circuit is a read control circuit formed of transistors 33, 34, and 37. The bases of transistors 33, 34 are connected, respectively, to the base electrodes of transistors 31, 32. The emitters of transistors 33, 34 are commoned for connection to the collector of transistor 37. The data output from the cell is taken to a data output amplifier 39 connected in the collector circuit of transistor 34. Transistors 33, 34 form a current switch with the current sink consisting of transistor 37. Transistor 37 is connected in common to the corresponding transistor emitter electrodes of each cell in the column, such as those connected at 38*a*, 38*b*. All of these transistors 37 in a given column act with read amplifier 40 as an *m* input current switch where *m* is the number of rows in the array.

Figure 3:
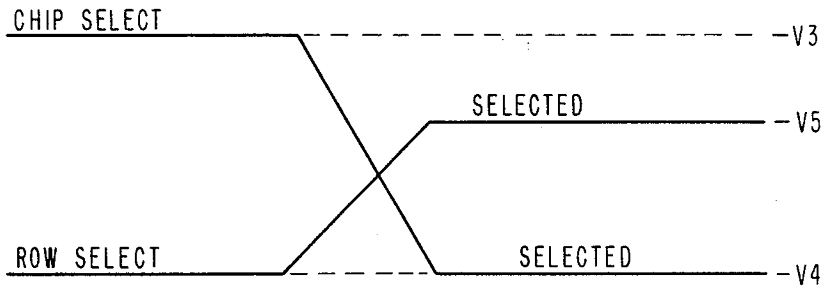
FIG. 3 is a voltage level diagram illustrating the manner of selection for a particular row of the memory cells of FIG. 2.

In a data retrieval operation, the nominal potential difference across the flip flop 31, 32 is sufficient to form a current switch out of transistors 33, 34. This current switch is employed to transmit the state of the storage circuit to the data output provided by output amplifier 39 at the terminal 41. Current switch 33, 34 drives the current source collector of transistor 37. Current sink 37 draws current only on the simultaneous application of the positive read select signal provided at terminal 42 from decode circuits 12 and the negative chip select signal provided at terminal 43 from chip select circuit 23. The chip select signal is provided to read amplifier 40 so that current flows through this transistor to the current sink —V2. As shown in FIG. 3, the operating voltage levels for performing the read operation require that the chip select signal be switched from —V3 to —V4. This is a full select signal. The positive row select signal at terminal 42 is switched from —V4 to —V5 which is a half select signal.

When the chip select input at 43 is in the —V3 condition, that is, the chip is not selected for the read operation, its input is sufficiently positive for transistor 40 to draw all the current to the sink —V2. The data output at 41 is therefore biased to a down level for an unused chip. When the chip select input at 43 is biased at a —V4 level, that is, the chip is selected, the current is drawn through transistor 37 in that column. This current is drawn by transistor 33 or 34 depending on the state of flip flop 31, 32. This is due to the connection of the bases of transistors 31, 33 and 32, 34. Since the collector of transistor 34 drives the data output amplifier 39, the state of the storage circuit is transmitted to terminal 41. The data output circuits include the current sink 40 and amplifier 39, which is coupled at its base to the column inputs provided at the transistors 40 for each column of he array and to the collectors of the transistors of each storage cell.

The write control circuits are formed of transistors 35, 36 connected in the collector circuits of transistors 31, 32, respectively. The emitters of transistors 35, 36 are connected in common with the emitters of transistors 45, 46, respectively, to form a current switch. In each instance, the emitter of each transistor 35 is common to every corresponding cell output in that column due to the connections at 44*a*, 44*b*, so as to form an m input current switch with the transistor 45. Similarly, the emitter of each of the transistors 36 in a column due to the connections at 47*a*, 47*b* forms a current switch with the transistor 46.

When writing or storage of information is not being performed in a storage circuit, the data inputs W1 and W0 are sufficiently positive so that currents *i*1, *i*0 are drawn by transistors 45, 46, respectively. When storage is being performed, one of the write inputs W1 or W0 provided at terminals 48, 49, respectively, is switched to a negative level depending upon the state of the data to be stored in the circuit. At this time, the selected row transistor 35 or 36 accepts the positive row select signal at the terminal 50 from the decode circuits 11 to draw current. The current switch operating levels are identical to those described with respect to the read operation. The chip select input corresponds to W1 or W0 and the row select input level for the write operation is the same as the row select input level for the read operation.

The current *i*1 or *i*0 when drawn through either transistor 35 or 36 is required to be of a sufficient level to change the state of circuit 31, 32. Thus, as already stated, a binary 1 stored in circuit 31, 32 provides for the base of transistor 31 to be more positive than that of transistor 32. In this case, substantially all the current from the current source at —V1 is drawn through transistor 31. When a binary 0 is written into the storage circuit, W0 drops to a negative level and transistor 36 draws the current *i*0. This current is of a sufficient magnitude to cause the flip flop storage circuit 31, 32 to change state and transistor 32 draws essentially all of the current from the current source at —V1.

It is to be noted that in the write circuits for each storage cell, there is included a pair of transistors 35, 36 which are connected in common to the corresponding transistors in the same column to form an m input current switch with the transistors 45, 46. Thus, one each of the transistors 45, 46 is required for each column of the array. These transistors provide two independent current sources for each cell. It is readily apparent that as the two current sources never draw current at the same time, the data-in circuitry may be implemented utilizing only one current source, since only a binary 1 or binary 0 is written into the storage circuit at one time. In the event that only one current source is employed in place of the arrangement shown in FIG. 2, the current switches formed of the transistors 35 with the transistor 45 and the transistors 36 formed with the transistor 46 are cascoded.

The decode circuits 11, 12 shown in block form in FIG. 1 are simple decode circuits that may be implemented with current switch emitter follower circuits. In the particular case shown, each of the circuits 11, 12 would perform a 1 out of 4 decode operation. By using current switch emitter follower circuits, both the out-of-phase and in-phase outputs are provided by these circuits. Similarly, the write control circuits 20 may take the form of current switches which drive the base electrodes of the transistors 45,46 to provide full level switching at these transistors.

As already described, it is a feature of this invention to provide multiple data bussing for writing into the array or retrieving data from the array. Thus, if double data input bussing is performed, one set of data may be written into one set of cells of the array such as a row and another set of data may be written into another set of the array such as another row at the same time. Similarly, the same type of operation may be performed where double data output bussing is implemented in the array. When both are implemented, then four different operations may be performed simultaneously on the array.

Figure 4:
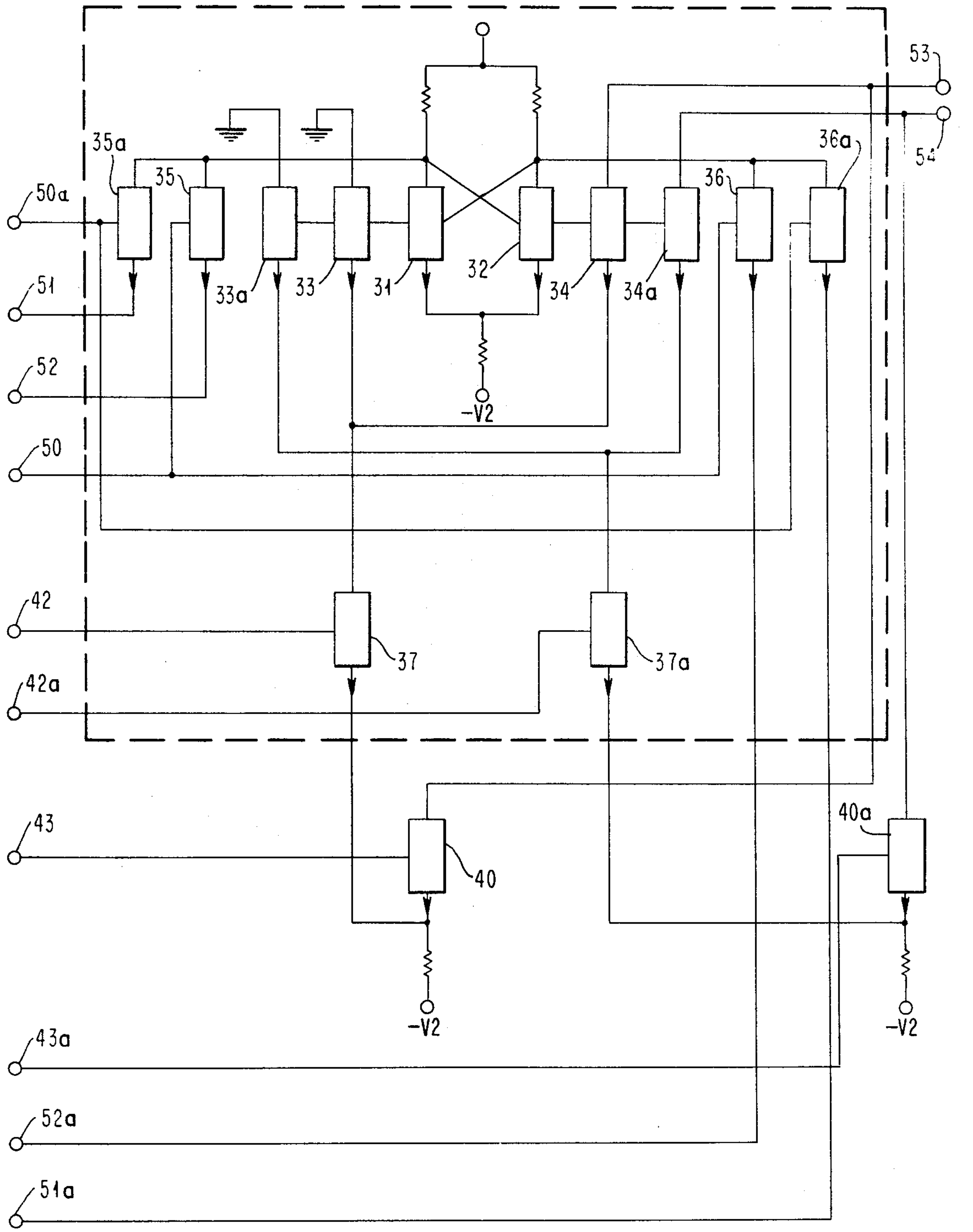
FIG. 4 is a schematic diagram of an expanded version of the cell of FIG. 2 for multiple data bussing.

Such an arrangement for accomplishing this is shown in FIG. 4 wherein like numerals are employed to identify the same elements as used in the arrangement of FIG. 2. To accomplish double data bussing for both storage and retrieval of information, additional circuits are added in parallel to the read control devices 33, 34, 37. These are identified as 33*a*, 34*a*, 37*a*. Similarly, to accomplish double data-in bussing additional control circuits are added in parallel with the transistors 35 and 36 and the corresponding current switching circuits which are not shown in FIG. 4. These additional transistors are connected at 35*a* and 36*a*. Separate row select signals are applied for controlling the writing at the terminals 50 and 50*a*. Separate data-in busses are provided at 51, 51*a* and 52, 52*a*, respectively. The chip select signals for the reading operation are provided at the terminals 43 and 43*a* to be supplied to the bases of the transistors 40 and 40*a*. The output data is provided from the two busses at the terminals 53 and 54, respectively.

Figure 5:
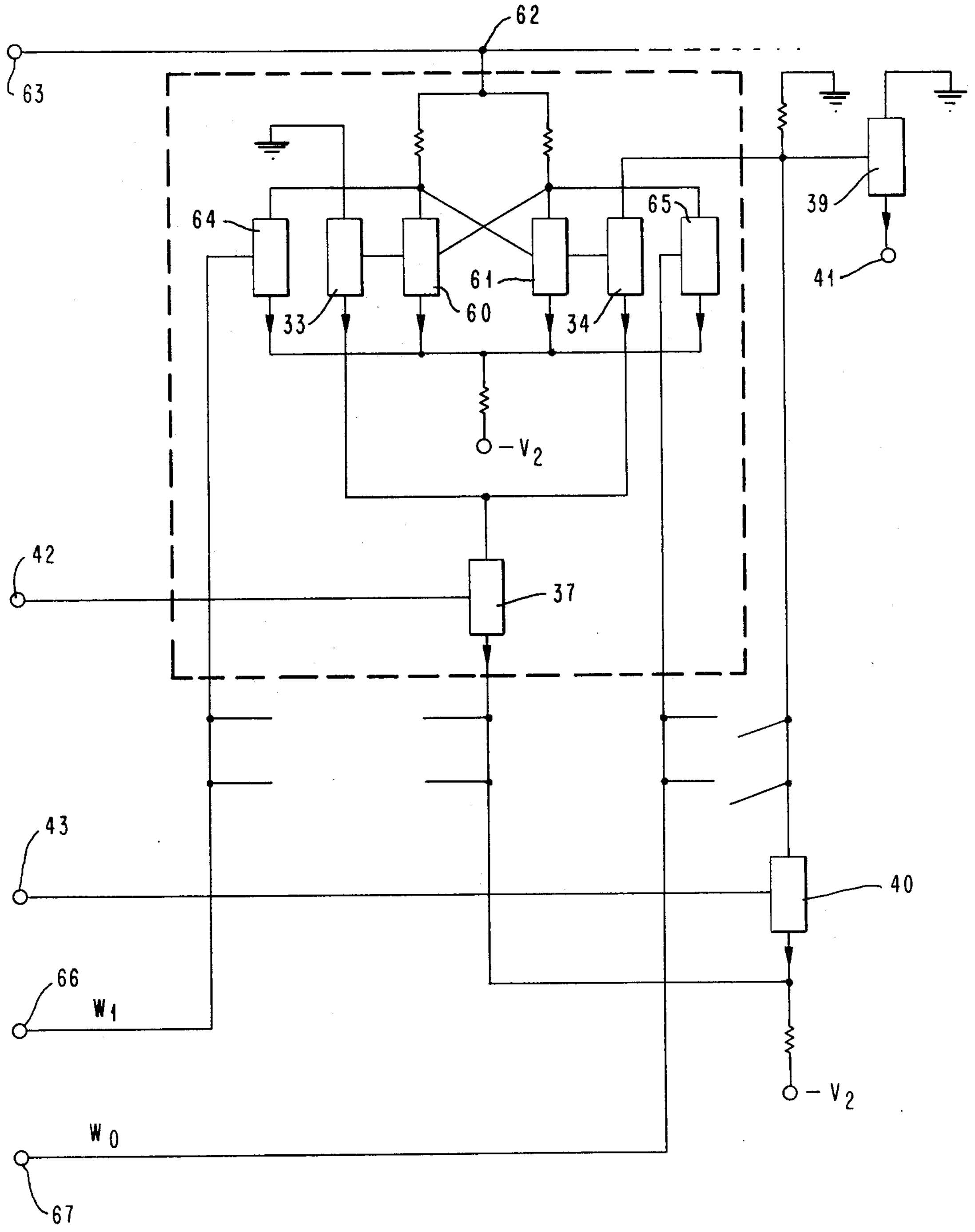
FIG. 5 is a schematic diagram of a second embodiment of a storage cell illustrating the principles of the invention.

Referring now to FIG. 5, this storage cell is slightly modified from the storage cell of FIG. 2 and also embodies the principles of the invention permitting the simultaneous writing and reading to be performed in an array of such cells. The storage circuit of the cell employs the transistors 60, 61 cross-coupled to form a bistable flip flop. The emitters of transistors 60, 61 are connected in common to a current sink at —V2. The collectors are driven by a negative row select signal provided at the terminal 63 from the decode circuits 11. Thus, all the cells in a particular row of the array are coupled to terminal 63.

The read operation for this cell is performed in the same manner as for the cell of FIG. 2. The circuit connections for this circuitry are the same as those of FIG. 2 and therefore the same numerals are employed to identify like elements. As in the case of the cell of FIG. 2, the bases of the transistors 33, 34 in FIG. 5 are connected, respectively, to the bases of the transistors 60, 61 of the storage circuit. To select a particular row for reading, the level of the signal at terminal 42 is raised and the level of the signal at terminal 43 is dropped. Current is conducted through either the transistor 33 or the transistor 34 and through the transistor 37 dependent on the information state stored in the storage circuit of the cell. An indication is provided from the collector of transistor 34 to the read out amplifier 39 and thus at the terminal 41.

The write operation is performed by the transistors 64, 65 in combination with the write row select input at terminal 62. The collectors of transistors 64, 65 are connected, respectively, to the collectors of transistors 60, 61, and the emitters of transistors 64, 65 are connected in common with the emitters of transistors 60, 61.

When writing is not being performed, both the inputs W1 and W0 provided at the terminals 66, 67, respectively, are more negative than the most negative write row select level provided at terminal 62. Thus, no current is drawn through transistors 64, 65.

Figure 6:
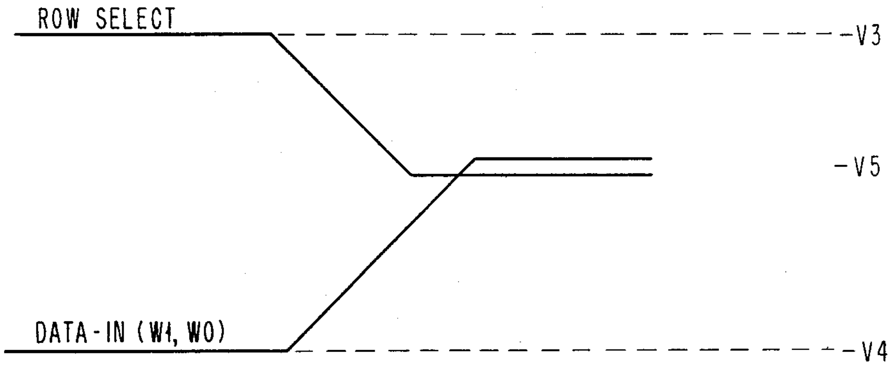
FIG. 6 is a voltage level diagram showing the level switching employed in the storage operation of the cell of FIG. 5.

When writing is to be performed, one of the inputs W1 or W0 is driven to a positive level as shown in FIG. 6. This level is not sufficient to draw current in either of the transistors 64 or 65 for an unselected row, but it is sufficient to draw some of the current through one of the transistors 64 or 65 for a selected row. During the writing operation when one of the transistors 64 or 65 begins to draw current in the storage cell, the flip flop draws current and assumes the state as determined by the transistor 64 or 65 that is drawing current. This occurs regardless of the state of the storage circuit before the writing operation. This change in state occurs if the positive level of the data-in signal W1 or W0 is at least as positive as the negative level of the write row select signal applied at terminal 62 and as shown in FIG. 6. Dependent on which of the input levels W1 or W0 is activated, a binary 1 or binary 0 is stored in the storage circuit.

The cell of FIG. 5 provides a modified way for accomplishing the same simultaneous storage and retrieval type of operation as described in conjunction with FIG. 2. The cell of FIG. 5 accommodates only multiple data-out bussing. In this respect, it is expanded in the same manner as provided for in FIG. 4. Multiple data input bussing cannot be accomplished with this cell. The cell of FIG. 5 has the advantage that in writing into it, its own standby current is employed. Thus, the storage or writing operation can be performed in all cells of the array at the same time if the same data is to be entered into all of the cells common to a column. In the writing operation for FIG. 5, half cell signals are employed.

Figure 7:
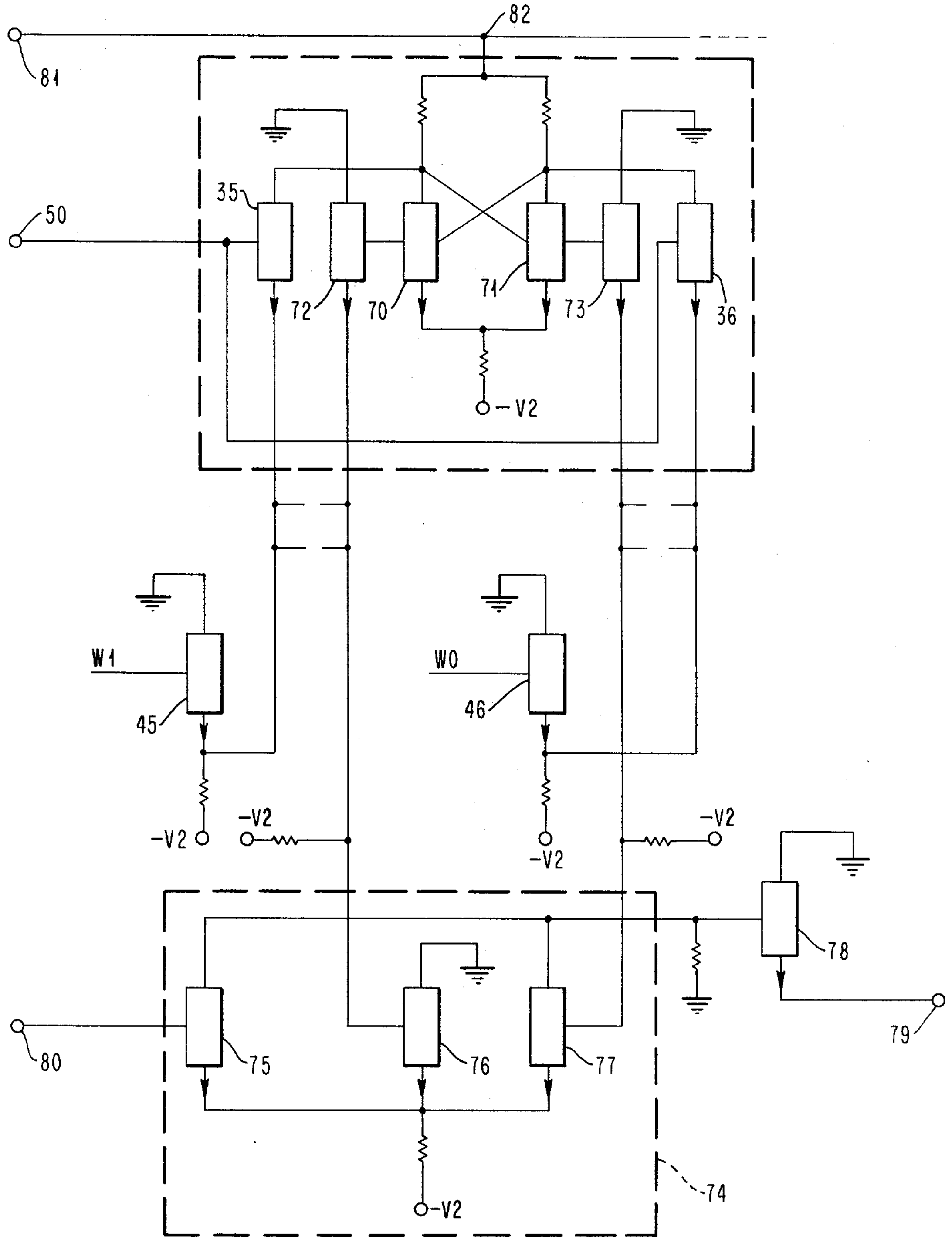
FIG. 7 is a schematic diagram of another embodiment of a storage cell embodying the principles of the invention.

A third embodiment of a cell for accomplishing the simultaneous storage and retrieval of information from different portions of an array employing the cell is shown in FIG. 7. In this cell, the storage circuit is connected the same way as the cell of FIG. 2 with the transistors 70, 71 connected in cross-coupled manner to form a bistable flip flop. The write control circuitry is the same as that employed in FIG. 2 with the transistors 35, 36 having their collectors connected to the collector circuits of transistors 70, 71. A positive row select signal for the writing operation is provided at terminal 50 from decode circuits 11. The data to be stored is provided by either one of the transistors 45, 46 in the same manner as described for the cell of FIG. 2. The transistors 45 and 46 are driven from normal current switching logic circuits.

The cell of FIG. 7 differs from the cell of FIG. 2 in the manner in which the retrieval of information is accomplished. Transistors 72 and 73 have their bases connected in common, respectively, to the transistors 70, 71, and their collectors to ground level. The emitters of these transistors are connected to a differential type amplifier 74 formed of the transistors 75, 76, 77. The output of this amplifier drives the data-out amplifier 78 to provide an indication of the state of the storage cell at terminal 79. The chip select signal is provided at terminal 80 for application to the base of transistor 75. The chip select operation is the same as that described for the cell of FIG. 2.

To accomplish the retrieval of information from a row of cells, a row is selected by raising the level at terminal 81 from the decode circuits 12. This change in level is reflected at terminal 82 connected to the collectors of transistors 70, 71. The nominal potential difference across transistors 70, 71 also appears at the bases of transistors 72, 73, respectively. Transistors 72, 73 drive the inputs to the transistors 76, 77, respectively, in the read amplifier 74. In this way, the data in the cell is transmitted to the data output line for appearance at terminal 79.

Figure 8:
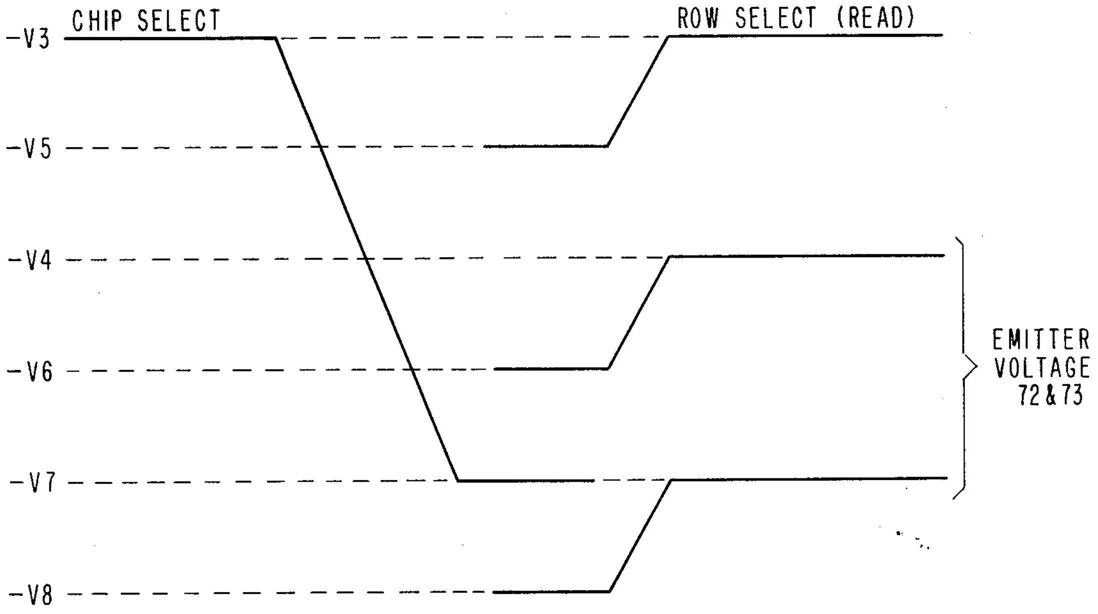
FIG. 8 is a voltage level switching diagram illustrating the retrieval operation of the cell of FIG. 7.

The operation of the cell of FIG. 7 is shown in FIG. 8. The chip select is switched from the −V3 level to the −V7 level to select the chip. The row select at terminal 81 is switched from the −V5 level to the −V3 level to select the row. The emitter voltages at the emitters of the transistors 72, 73 are raised, respectively, from −V6 and −V8 levels to the −V4 and −V7 levels. The potential difference between −V4 and −V7 is of sufficient amplitude to create a current switch of the data-out amplifier 74. The same occurs for −V3 and −V4. The mode of retrieving information from the cell of FIG. 7 is considerably simpler than that required for the cell of FIG. 2. At least one transistor per cell, that is the transistor 37 in FIG. 2, is eliminated from each cell. However, a more complex output amplifier is required. However, as only one such amplifier is required per column of the array, a substantial savings in transistors is achieved.

Figure 9:
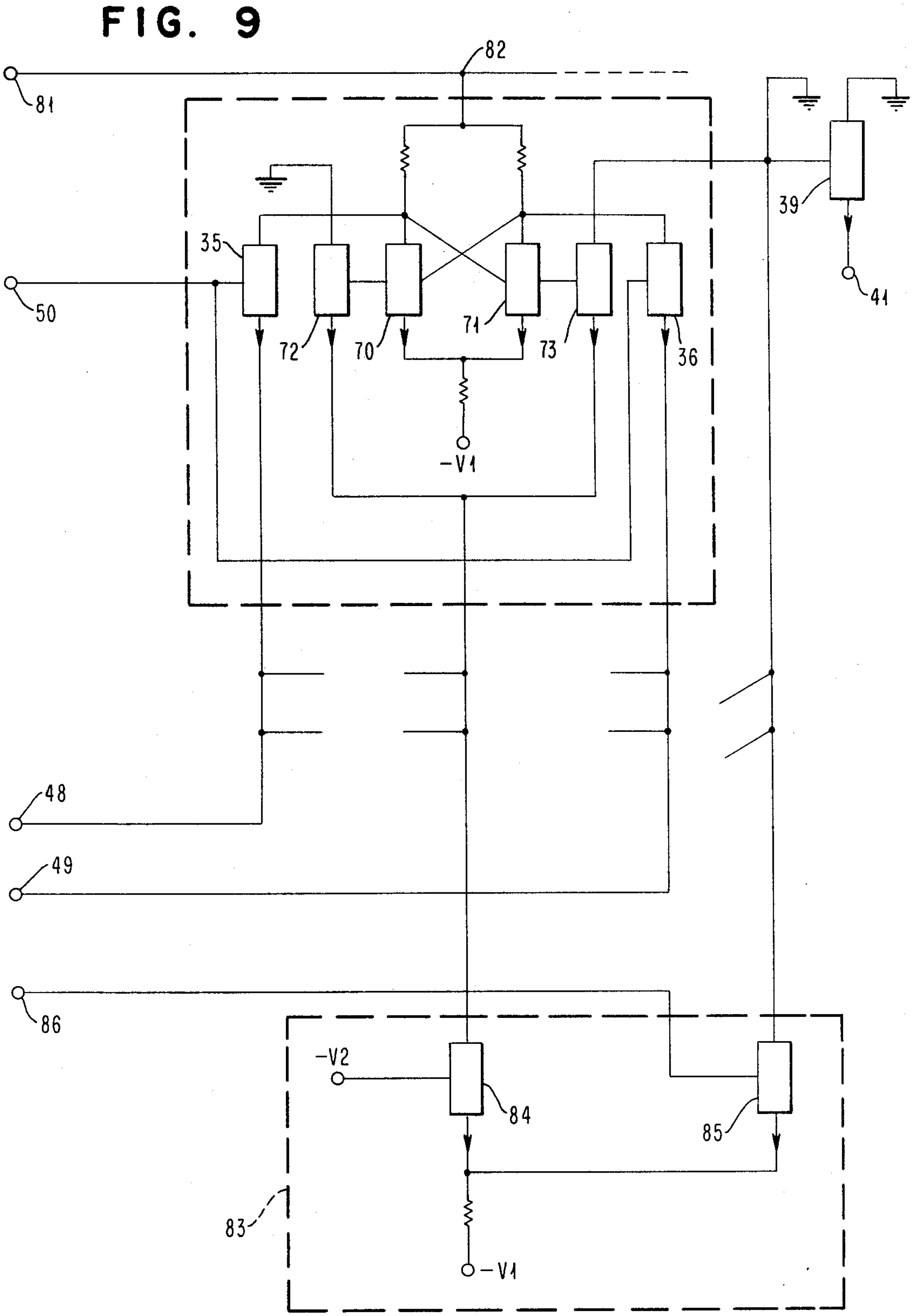
FIG. 9 is a schematic diagram of a modified version of the cell of FIG. 7 illustrating another form of information retrieval from the storage cell.

The circuit of FIG. 9 employs substantially the same cell configuration as that of FIG. 7. The output circuitry is somewhat modified so that the retrieval control circuits formed of the transistors 72, 73 drive a simpler amplifier 83 formed of the current switch with transistors 84, 85. The output indication to the data-out amplifier 39 is taken from the collector of transistor 73. The chip select signal at terminal 86 is applied to transistor 85. The amplifier 83 acts as the read amplifier providing its output to the amplifier 39.

With the cell of FIG. 7, multiple data-in bussing is accomplished in the same manner as described for the cell of FIG. 4. Additional write control circuits are added in parallel in the cell so that plural sets of data may be stored simultaneously in respective plural sets of cells.

It is readily apparent that various ways of accomplishing the storage and retrieval of information may be interchanged from one cell to another in order to optimize a particular array of such cells. It is considered to be within the purview of one in this art to make such changes as are necessary to accomplish this.

While this invention has been particularly described with reference to the preferred embodiments thereof, it will be understood by those skilled in the art that the foregoing and other changes in form and details may be made therein without departing from the spirit and scope of the invention.

What is claimed is:

1. An array of information storage cells, comprising a plurality of storage cells arranged in a matrix, each of said cells comprising an information storage circuit and storing control circuitry and retrieving control circuitry, each connected independently of the other to said storage circuit, first accessing means coupled to the storing control circuitry of the corresponding cells along a first axis of the matrix for selecting a first set of cells along said axis for the storage of information, second accessing means coupled to the retrieving control circuitry of the corresponding cells along said first axis of the matrix for selecting a second set of cells along the same axis for the retrieval of information, means coupled to the storing control circuitry of corresponding cells along a second axis of the matrix for storing information in at least one of said first set of cells when said cells are selected, and means coupled to the retrieving control circuitry of corresponding cells along the second axis of said matrix for retrieving information from at least one of the second set of cells when said cells are selected, whereby independent storage and retrieval of information is performed in the first and second sets of cells, respectively, of said array.

2. The array of claim 1, wherein the information storage circuit of each of said cells comprises a bistable flip flop circuit formed of first and second transistors cross-coupled between their respective bases and collectors, and the storing control circuitry is connected in the respective collector circuits of said transistors for receiving selection signals from said first accessing means for storing information and signals from said information storing means indicative of the information to be stored.

3. The array of claim 2, wherein the storing control circuitry comprises a plurality of individual storing control circuits connected in parallel in the respective collector circuits of said transistors, each of said storing control circuits receiving its own selection signals from said first accessing means for storing differing information in differing sets of said cells of said array and each of said storing control circuits receiving differing signals from said information storing means to accomplish multiple bussing data in storage in the cells of said array.

4. The array of claim 1, wherein the information storage circuit of each of said cells comprises a bistable flip flop circuit formed of first and second transistors cross-coupled between their respective bases and collectors, and the storing control circuitry is connected in the respective collector circuits of said transistors and in common in the emitter circuits of said transistors for receiving selection signals from said first accessing means for storing information and signals from said information storing means indicative of the information to be stored, said selection signals being received in the collector circuits of said transistors.

5. The array of claim 1, wherein the information storage circuit of each of said cells comprises a bistable flip flop circuit formed of first and second transistors cross-coupled between their respective bases and collectors, and the retrieving control circuitry is connected in the respective base circuits of said transistors for receiving selection signals from said information retrieving means and from said second accessing means for retrieving information and for providing an indication of said information.

6. The array of claim 5, wherein the retrieving control circuitry comprises a plurality of retrieving control circuits connected in parallel in the respective base circuits of said transistors, each of said retrieving control circuits receiving its own selection signals from said information retrieving means and from said second accessing means for retrieving information from differing sets of said cells of said array and for providing signals indicative of said information to accomplish multiple bussing of data-out retrieval from the cells of said array.

7. An array of information storage cells operable independently and simultaneously on a first set of cells to store information and on a second set of cells to retrieve information, comprising a plurality of storage cells arranged in a matrix of $n$ columns and $m$ rows, each of said cells comprising an information storage circuit and storing and retrieving control circuits connected independently of one another to said storage circuit, first decode means coupled to all of said storing control circuits for selecting one of said $m$ rows for storing information, second decode means coupled to all of said retrieving control circuits for selecting another of said $m$ rows for retrieving information, means coupled to the storing control circuits of the cells along the columns of said array for storing information in at least one of the cells of the row selected for storing information, and means coupled to the retrieving control circuits of the cells along the columns of said array for retrieving information from at least one of the cells of the row selected for retrieving information when the cells of a predetermined portion of said array are conditioned for such retrieval.

8. An information storage cell for use in an array of such cells to provide independent and simultaneous access for storing and retrieving of information, comprising an information storage circuit formed of a transistorized bistable flip flop circuit with the respective bases and collectors of said transistors cross-coupled, a first control circuit coupled in the respective collector circuits of said transistors to said storage circuit for receiving signals selecting said cell for storing information and information signals indicative of the information to be stored, and a second control circuit in the respective base circuits of said transistors coupled independently of said first control circuit to said storage circuit for receiving signals selecting said cell for retrieval of information and providing an indication thereof when information is not being stored in said cell.

9. An array of information storage cells for independently accomplishing multiple data bus in and data bus out storage and retrieval of information comprising a plurality of storage cells arranged in a matrix each of said cells comprising an information storage circuit, a plurality of storing control circuits connected in common to said storage circuit and in parallel to each other for receiving signals to select a first group of differing sets of said cells for storing information, and a plurality of retrieving control circuits connected in common to said storage circuit and in parallel to each other for receiving signals to select a second group of differing sets of said cells for retrieving information, said plurality of retrieving control circuits being connected to said storage circuit independently of said plurality of storing control circuits, first means coupled to the storing control circuits for providing said storing selection signals to said first group of differing sets of cells, second means coupled to the retrieving control circuits for providing said retrieving selecting signals to said second group of differing sets of said cells, means coupled to the storing control circuits for storing differing information in the storage circuits of said differing sets of said first group when the cells of said group are selected, and means coupled to the retrieving control circuits for retrieving differing information from the storage circuits of said differing sets of said second group when the cells of said group are selected.

* * * * *

Disclaimer

3,675,218.—*Robert F. Sechler,* Wappingers Falls, N.Y. INDEPENDENT READ-WRITE MONOLITHIC MEMORY ARRAY. Patent dated July 4, 1972. Disclaimer filed June 20, 1983, by the assignee, *International Business Machines Corp.*

Hereby enters this disclaimer to claims 1-9 of said patent.

[*Official Gazette August 16, 1983.*]